CONTROLLABLE OSCILLATORY CIRCUIT WITH A PLURALITY OF STABLE STATES

Filed May 13, 1964

3,323,077

CONTROLLABLE OSCILLATORY CIRCUIT WITH A PLURALITY OF STABLE STATES

Vitaly Petrovich Sigorsky, Leonid Semenovich Sitnikov, and Lev Lazarevich Utjakov, all of Novosibirsk, U.S.S.R., assignors to Institute Matematiki Sibirskogo Otdelenia Akademii, Nauk, U.S.S.R.

Filed May 13, 1964, Ser. No. 367,167
3 Claims. (Cl. 331—117)

This invention relates to devices with several stable states differing in the voltage level or in the frequency of the generated oscillations.

It is well known that devices with a great number of stable states differing in combinations of voltage levels, can be designed as a ring counter, or a decatron (decade counter). However, a specific feature of these devices is that an increase of the number of stable states thereof is associated with a proportional increase of the number of active elements. On the other hand, devices are known, the stable states of which differ either in frequency or in phase of the generated oscillations. For example, parametric devices and self-oscillators with a multiple frequency synchronization belong to this type. These devices require a source of high-frequency oscillations and have a narrow range of stable states when the circuit is detuned or when the amplitude or the frequency of the high-frequency supply signal is changed.

It has been established according to the invention that by using a resonance circuit with a variable natural frequency, an element the output voltage amplitude of which depends on its input frequency of oscillations, and a comb filter, a device with a great number of stable states can be made, which will be free of the disadvantages inherent in the devices known heretofore. In the proposed device an increase of the number of stable states can be brought about without augmenting the circuit with any supplementary elements. Neither does the device require a source of high-frequency oscillations.

In the broad sense, the invention is intended for use in computers and, in particular, in electronic calculators and digital integrators with a decimal number base.

In accordance with the above and other objects, the invention consists of a new device and a combination of parts and elements thereof as described here and below and claimed in the appended claims.

Other objects and advantages of the invention will become apparent from the following detailed description and the accompanying drawings wherein.

Figure 1:
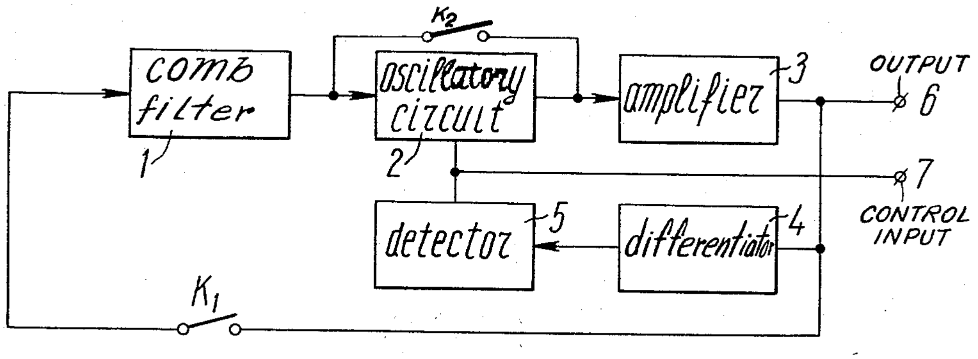
FIG. 1 is a block-diagram of the device.
Figure 2:
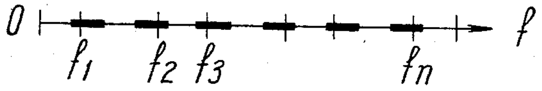
FIG. 2 shows the generation frequency ranges of the device with switch $K_2$ closed.

The device (FIG. 1) operates as follows: Let us assume that we have closed switches $K_1$ and $K_2$, thereby short-circuiting the resonance circuit 2 (by connecting the output with the input). In this case comb filter 1 and amplifier 3 will function as a relaxation generator the oscillation spectrum of which comprises all frequencies for which the conditions of self-excitation are fulfilled. If now switch $K_2$ is opened, the oscillatory circuit 2 will be effective to maintain a condition of self-excitation only for the frequency which coincides with the transmission band of the oscillatory circuit. According to the value of the natural frequency of the circuit there will be either no oscillations in the oscillatory device, or the frequency of the oscillations will be near to the natural frequency of the oscillatory circuit. The natural frequency of the circuit 2 can be varied with switch $K_2$ open. In FIG. 2 the generation frequency ranges are shown by thick lines for a opened position of switch $K_2$. When switch $K_2$ is closed, the natural frequency of the circuit becomes dependent on the generation frequency of oscillatory circuit 2, as the circuit is controlled by the rectified current produced by the sine-wave signal which pass through element 4 operating as a differentiator, the output voltage amplitude of which depends on the input frequency, and through detector 5 with a ripple filter.

If in the device according to the invention, the natural frequency of the circuit is changed by an external action, a further change in the natural frequency will be produced, owing to feedback from the output of amplifier 3 to the control input of circuit 2 which causes modification of the amplitude of oscillation which, in turn, will bring about a change of the parameters of the oscillatory circuit, thus eventually bringing its natural frequency closer to one of the generated frequencies as shown in FIG. 2. This process results in a stable generation in one of the possible ranges (FIG. 2).

Figure 3:
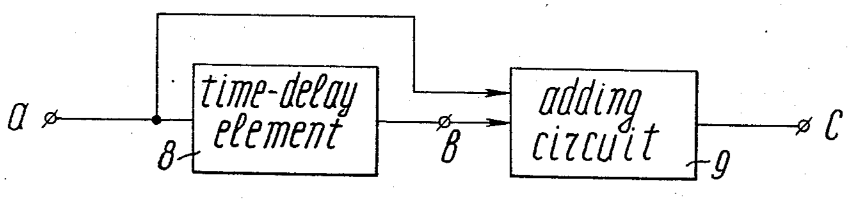
FIG. 3 is a block-diagram of the comb filter.

The comb filter 1 is constituted by a simple time-delay element and an adding circuit (FIG. 3).

Let us assume that the voltage at point A is equal to $$u_1=u_0 \sin \omega t$$

where $u_0$ is the input voltage;
$\omega$ is the circular frequency.

The output voltage of the time delay line at point B will be $$u_2=u_0 \sin \omega(t-\tau)$$

where $\tau$ is the delay time. The output voltage of the adding circuit at point C will equal $$u_3=u_1+u_2=u_0[\sin \omega t+\sin \omega(t-\tau)]$$

Therefore, the operational transmission factor equals $$K_{(p)}=1+e^{p\tau}$$

and its modulus is:

$$[K_{(\omega)}]=2 \cos \frac{\omega\tau}{2}$$

The latter formula shows that the amplitude versus frequency characteristic of the system (FIG. 3) consists of a number of alternately rising and drooping portions.

Figure 4:
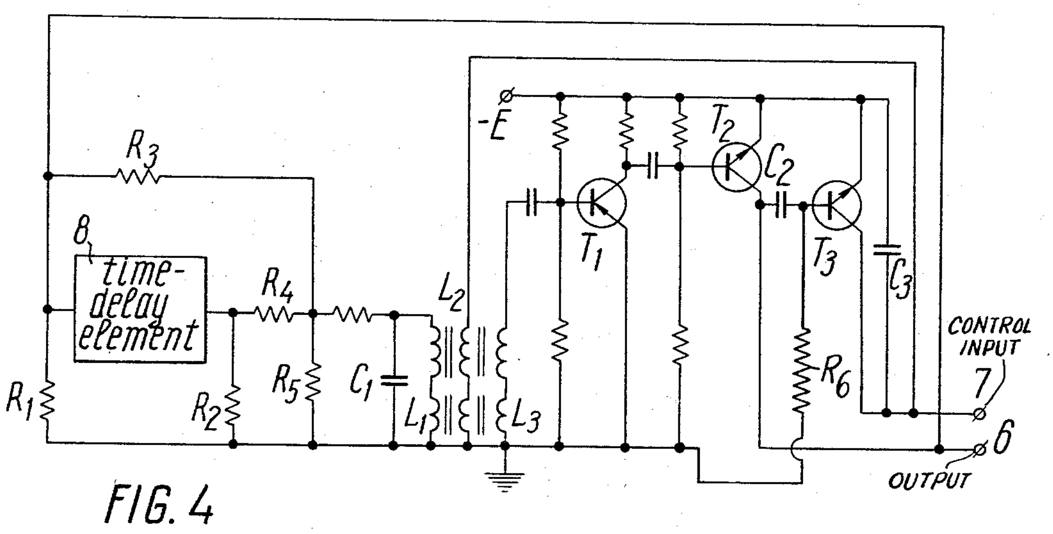
FIG. 4 represents one of the possible embodiments of the device according to the invention.

In order that the present invention will be completely understood by those skilled in the art, one of the possible embodiments of the device is given in FIG. 4 by way of illustration.

In the circuit diagram, $C_1L_1$ is the controlled circuit; $L_2$ is a bias winding (changes of the current in this winding bring about a change in the inductance and, therefore, in the natural frequency of the circuit); $L_3$ is the secondary winding of a transformer. The amplifier employs transistors $T_1$ and $T_2$ and its output is connected to comb filter 1 and through elements $C_2R_6$ operating as a differentiating circuit, the transmission factor of which depends on the frequency, to a rectifier, employing transistor $T_3$, and to a filter (capacitor $C_3$). The filter output is connected to bias winding $L_2$ of the circuit. Resistors $R_1$ and $R_2$ are matching impedances of the delay line of the comb filter. Resistors $R_3$, $R_4$, $R_5$ form an adder.

The transition from one stable state to another can be brought about by changing the circuit frequency by way of short-time connection of the current source to the secondary transformer winding connected either in accordance with, or in opposition to, the bias winding depending on the direction of the transition, or by changing the base voltage of transistor $T_3$. Thus, for any steady state condition there is a definite potential at terminal 7. Therefore, the device can be shifted to any desired state by supplying the control input (terminal 7) of circuit 2 with the voltage indicative of the given state fed from an outside source. In response to the voltage, circuit 2 is tuned to the frequency $w_1$ associated with a predetermined state, and as soon as the external action ceases, the device remains in this state as long as possible due to the action of the signal in the feedback circuit comprising element 4 and detector 5.

The present invention may be used, in particular, as an element of a counter.

Although the present invention has been described with reference to a preferable embodiment, various changes and modifications may be made without departing from the spirit and scope of the invention, as those skilled in the art will easily understand.

These changes and modifications are regarded as falling within the scope of the invention as defined by the appended claims.

What we claim is:

1. A device with a plurality of stable states differing in the frequency and voltage levels of the generated signals, said device comprising a comb filter including an input terminal and an output terminal, an amplifier including an input terminal, and an output terminal connected to the input terminal of said comb filter, an oscillatory circuit including an input terminal connected to the output terminal of the comb filter and an output terminal connected to the input terminal of the amplifier, said oscillatory circuit having a variable-frequency output, and including a control input terminal by which said variable-frequency output can be varied, and detector means connected to the output terminal of the amplifier and to said control input terminal of the oscillatory circuit in feedback relation for controlling the amplitude of the output of the oscillatory circuit in proportion to the frequency of the output of the oscillatory circuit.

2. A device as claimed in claim 1 wherein said comb filter comprises a delay element including an input terminal and an output terminal, and an adding circuit connected to said input terminal and to said output terminal of the delay element.

3. A device as claimed in claim 1 wherein said detector means comprises a differentiating circuit and a detector connected in series.

No references cited.

ROY LAKE, *Primary Examiner.*

S. H. GRIMM, *Assistant Examiner.*